UNITED STATES PATENT OFFICE.

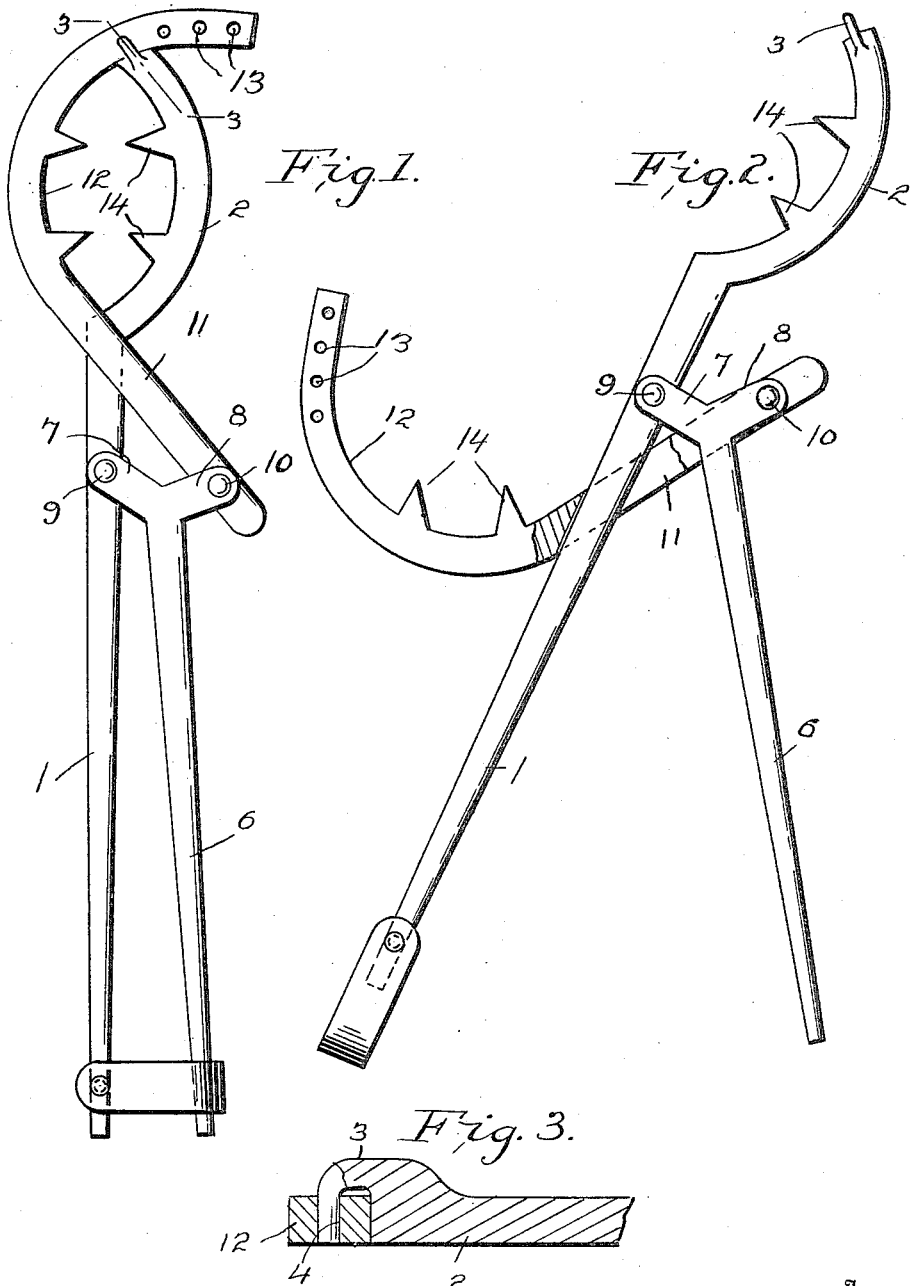

GEORGE B. HEATHERINGTON, OF SIDNEY, IOWA.

HORSESHOE-REMOVER.

1,127,760. Specification of Letters Patent. Patented Feb. 9, 1915.

Application filed December 23, 1913. Serial No. 808,485.

*To all whom it may concern:*

Be it known that I, GEORGE B. HEATHERINGTON, a citizen of the United States, residing at Sidney, in the county of Fremont and State of Iowa, have invented certain new and useful Improvements in Horseshoe-Removers; and I do hereby declare the following to be a full, clear, and exact description of the invention, such as will enable others skilled in the art to which it appertains to make and use the same.

This invention relates to new and useful improvements in horse shoe removers and has for its object the provision of a device of the above character which is adapted to be used in the removal of shoes from the hoofs of horses.

Another object of my invention is to provide a device of the above character wherein the removal of horse shoes may be easily and quickly accomplished without endangering the person of the operator.

A still further object of my invention is the provision of a device of the above character which may be easily and quickly operated and which will be simple in construction, and durable in use.

With the above and other objects in view I now proceed to describe my invention in the following specification and accompanying drawings, in which, Figure 1 is a view of my improved shoe remover showing the same in its closed position, Fig. 2 is a view of my improved shoe remover showing the same in its open position, and Fig. 3 is an enlarged transverse sectional view of my improved shoe remover taken on line 3—3 of Fig. 1.

Referring to the drawings by characters of reference 1 indicates the handle portion of my improved shoe remover having formed at the upper extremity thereof the segmental portion 2. This segmental portion terminates at its upper extremity in a lug 3 which is bent near its end, as shown at 4, to engage the coöperating member, as will be more fully hereinafter described.

Pivotally secured to the handle 1, near its upper extremity, I preferably provide the lever or handle 6, which is provided at its upper end with the angular extensions 7 and 8, said angular extension 7 being connected to the handle portion 1 by means of a rivet or bolt 9, which pivotally holds the lever 6 in operative relation with the handle. The oppositely extending angular extension 8 is provided with an aperture through which the pin 10 is adapted to pass, the use of which will be more fully hereinafter described.

A bar 11 is pivotally secured to the extension 8 by means of the pin 10 and is provided at its opposite extremity with the curved portion 12 having formed adjacent the outer end thereof the apertures 13 which are adapted to receive the end or extension 4 of the lug 3. Suitable inwardly extending projections 14 which are preferably pointed at their ends, as clearly illustrated in Figs. 1 and 2 are provided and are adapted to be forced between the bottom of the hoof of a horse and the horse shoe and thereby hold the device in operative relation with the whole.

It will be apparent from the foregoing that in use my improved shoe remover is adjusted to the desired size by means of the apertures 13 and the angular extension 4. It will be obvious that when the handle 6 is pressed toward the handle 1 the jaws formed by the curved portions 2 and 12 will be forced toward each other and the inwardly pointed extending projections 14 will be forced between the shoe and the horse's hoof which is to be operated upon. The operator then places the hoof on the ground or floor, such as the case might be, and stands on the handle portions. The horse is then moved and it will be apparent that the shoe will be pulled from the hoof in a simple and easy manner, thus materially assisting in the reshoeing of horses.

While in the foregoing I have shown and described the preferred embodiment of my invention I wish it to be understood that I may change the specific arrangement and combination of parts, without in any way departing from the spirit and scope of my invention as defined in the appended claims.

What is claimed is:—

1. In a device of the character described a handle, an arcuate extension formed at the outer extremity of the handle, a lug formed at the outer extremity of said arcuate extension, a lever pivotally secured to the handle, a bar pivotally secured to the lever and crossing the handle, an arcuate extension at the end of the bar opposite its secured end, said arcuate extension having apertures therein, the apertures of the arcuate extension being adapted to receive the end of the lug and hold the jaws formed by the arcuate extension in operative relation and pointed extensions on the opposite inner faces of the arcuate extensions.

2. A device of the character described comprising a handle, an arcuate extension formed at the outer extremity of said handle, a lug formed integrally with the outer extremity of the arcuate extension, said lug being bent downwardly, a lever, angular extensions formed at one end of said lever, one of said angular extensions being pivotally connected to the handle, a bar pivotally secured to the other of said extensions, an arcuate extension formed at the bar opposite its pivoted end, said arcuate extension having apertures adjacent the end opposite the bar, said apertures being adapted to receive the lug and hold the whole in the desired position, and pointed extensions on the inner faces of the arcuate extensions, said pointed extensions being formed integral with the said arcuate extensions and projecting toward the center thereof.

In testimony whereof I affix my signature in presence of two witnesses.

GEORGE B. HEATHERINGTON.

Witnesses:
W. S. LIGGETT,
W. S. STEPHENS.

Copies of this patent may be obtained for five cents each, by addressing the "Commissioner of Patents. Washington, D. C."